J. GOOD.
ROTARY VALVE.
APPLICATION FILED APR. 5, 1916.

1,254,795.

Patented Jan. 29, 1918.

Inventor
John Good
By
Attorney

UNITED STATES PATENT OFFICE.

JOHN GOOD, OF BROOKLYN, NEW YORK.

ROTARY VALVE.

1,254,795.   Specification of Letters Patent.   Patented Jan. 29, 1918.

Application filed April 5, 1916. Serial No. 88,993.

*To all whom it may concern:*

Be it known that I, JOHN GOOD, a citizen of the United States, residing in Brooklyn, in the county of Kings and State of New York, have invented the following-described Improvements in Rotary Valves.

This invention is an improvement in that class of rotary valve structures, particularly adapted for use in internal combustion engines, wherein the rotary valve member seats endwise upon a tapered or taper-curved seat, and wherein an oil film contact between the seating surfaces is relied upon to establish a ready heat escape from the rotary member to the cooled seat, for keeping the valve as a whole at a safe working temperature.

The present invention consists in ribbing or threading one or both the seating surfaces of such valves, as a means, first, of quickly reaching a uniform bearing throughout the whole seat area, and, second, as a means of promoting the oil film and the heat-dissipating functions of said surfaces.

In my prior application, Serial No. 74553, I have shown several rotary engine valves all operating by virtue of the pressure-sealing effect that can be obtained by opposing valve surfaces in imperfect pressureless and non-wearing contact, and discharging the excess heat in the rotary members through their cooled and lubricated seats, which are made large enough for that purpose. The seats of these valves are relied on to maintain the said non-wearing contact of the ported parts and also to preserve their own oil films for heat conduction purposes, and while they are entirely adequate and satisfactory for such purposes and capable of maintaining efficiency for indefinite periods, I have found their action is improved and other advantages are obtained by threading their contacting surfaces, one or both.

Figure 1:
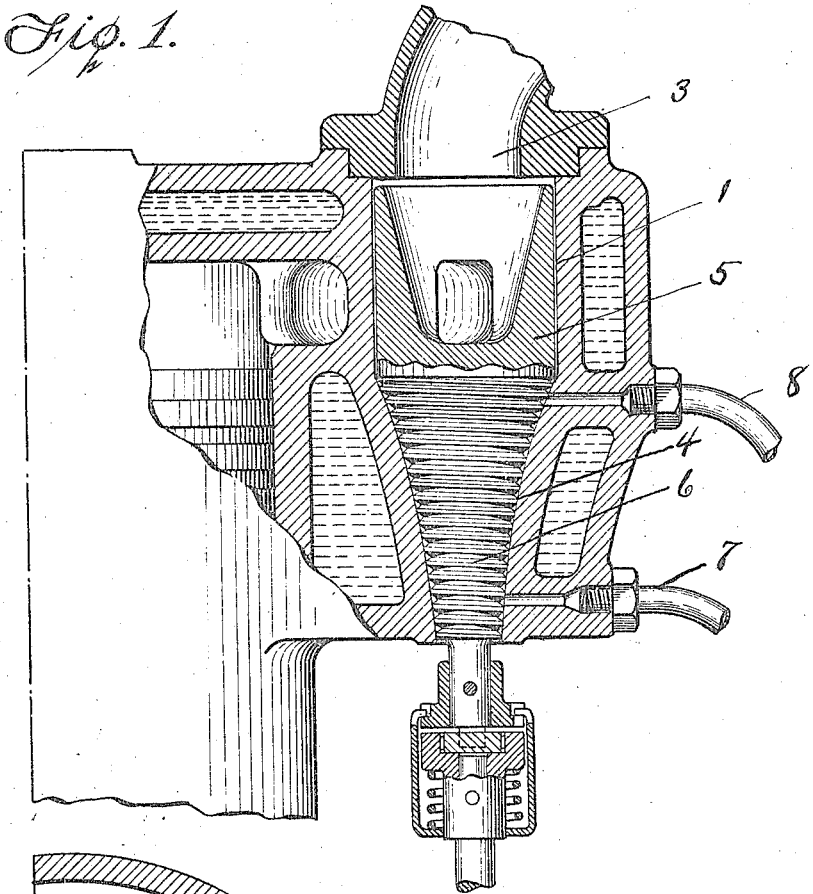
Figure 2:
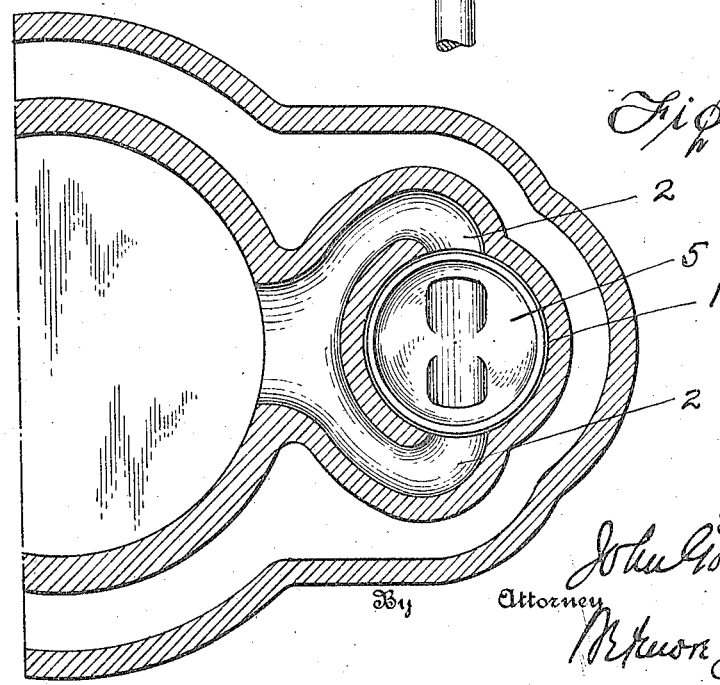

The accompanying drawings show,

In Figure 1 an axial section of a valve, indicating the threading;

Fig. 2 being a cross-section on the level of the ports.

The casing of the valve is water-jacketed and comprises a chamber, the upper part of which is cylindrical, as shown at 1, and ported at diametrically opposite sides, by ports 2, whereby it connects with the engine cylinder, and also open at the top for connection to the manifold 3. The lower part 4 is axially tapered, constituting the seat for the rotary valve member. The latter comprises an upper cylindrical ported part 5, the peripheral surface of which is disposed very closely proximate to but not in actual rubbing or pressure contact with the corresponding ported surface of the casing, and thereby it effectually seals the engine port without wear and hence without need of lubrication, as fully explained in the application above mentioned. The journal part 6 of said valve member, being tapered according to the seat taper and fitting the same over an extended area, serves to hold the said port-sealing surfaces in their said non-wearing relation, and since the valve member thrusts endwise on the valve,—*i. e.*, parallel with the said non-wearing surfaces, it continues to maintain the said relation notwithstanding considerable displacement from wear. The opposite relation of the valve ports 2 balances the engine pressure on the rotary member, and other expedients may also be taken to avoid lateral displacement or disalinement as the result of wear, and so as to insure that such wear as must occur shall take place symmetrically with respect to the axis of the valve. It is desirable also to design the ports so that the engine pressure does not thrust the valve against its seat, at least, not with its full force, so that the symmetrical endwise displacement and the power necessary to drive the valve may not be greater than necessary. Such a port design is shown in the drawings.

The threads on the seating surface are indicated in the drawing as applied to the rotary valve member throughout the full area of its contact with the casing. The valve member surface is first turned or shaped smooth to fit the seat, and in the present case the seat is made to conform to the surface of generation of an equi-tangential tractrix revolved about its axis, which is coincident with the axis of the valve. This surface has special advantages in producing and maintaining an oil film, as also explained in the application above referred to. The said surface is threaded with about twenty threads to the inch, more or less, and preferably in the direction of pitch which will tend to work the lubricating oil as the valve rotates away from the place of its inlet, that is to say, upwardly in the present case, although this is not essential, and ordinary knurling can be used, if desired. It is much preferred, however, to thread the surface as shown, the valleys being narrow or sharp but the lands rather broad and flat, as intended to be indicated in Fig. 1. If the original smooth fitting of the seat surfaces has failed to produce a uniform contact throughout the entire seat area, that can obviously be quickly obtained after the threading, since the high spots are then more readily rubbed or worn down to a uniform surface, and thereby the manufacture of the valve with an efficient oil film seating contact between all the land area and the seat is facilitated.

Notwithstanding that the threading of the surface reduces the total area of the opposing oil-film connected surfaces, I have ascertained that it does not diminish the rate of heat transfer but rather improves it,—a result which may be explained by the fact that the flat lands of the threads are constantly advancing over and wiping the whole surface of the cooled seat, or that the oil on the seat being in contact with a greater superficial area by reason of the threading, thereby more readily extracts heat from the underlying metal, or possibly that the bearing of the lands upon the cooled seat is closer than can be easily obtainable by shaping the valve in a machine tool. In any event, the heat-transferring function and the valve structure as a whole, is materially improved as the result of the threading, it being possible also to increase the cooling effect by circulating a copious feed of oil through the seat, flowing through the threads from the inlet duct 7 to the outlet duct 8. I have not illustrated the oil-circulating means, which is, of course, well known to the art.

It will be apparent that the improved contact serves its intended function of promoting the transfer of heat from the rotary valve member quite regardless of the port arrangement and that the invention is therefore not confined to the particular style of valve illustrated but may be used with other valves seating endwise in their casings, and whether the ports be cut through non-wearing and dry-running surfaces, as in the case taken for illustration, or through the seat surface itself.

I claim:

1. A rotary valve comprising, in combination, a casing member and a rotary valve member having a tapered seat thereon, the seating surfaces of one of said members being constituted by the lands between a multiplicity of fine grooves cut therein, and means for cooling the casing.

2. A rotary valve comprising, in combination, a casing member and a rotary valve member having a tapered seat thereon, the seating surface of one of said members being constituted by the lands of a continuous screw thread cut in said member, said lands being of substantially the same width as the grooves between them.

3. A rotary valve comprising, in combination, a casing member and a rotary valve member having a tapered seat thereon, the seating surface of one of said members being constituted by the lands of a screw thread cut in said member and having a direction of pitch tending to work the oil upward in said seat.

4. A rotary valve comprising, in combination, a casing member and a rotary valve member seated endwise thereon, the seating surfaces being curved according to the surface of revolution of an equi-tangential tractrix, and one of said surfaces being constituted by the lands of parallel screw threads, and means providing an escape for heat from the seating surface of the casing.

5. The combination of a casing, a rotary valve member comprising opposed unlubricated pressureless port-sealing surfaces and axially tapered lubricated seating surfaces adapted to support said port-sealing surfaces in said pressureless relation, one of said seating surfaces being constituted by the lands of a screw-thread, and means for cooling the casing.

In testimony whereof, I have signed this specification.

JOHN GOOD.